Sept. 7, 1948.  J. PATRICK  2,448,618
TRAP
Filed Oct. 4, 1944
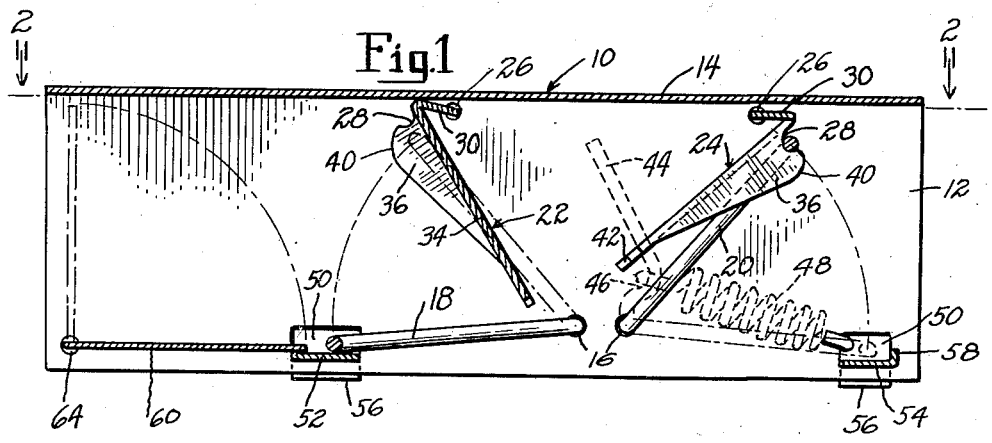
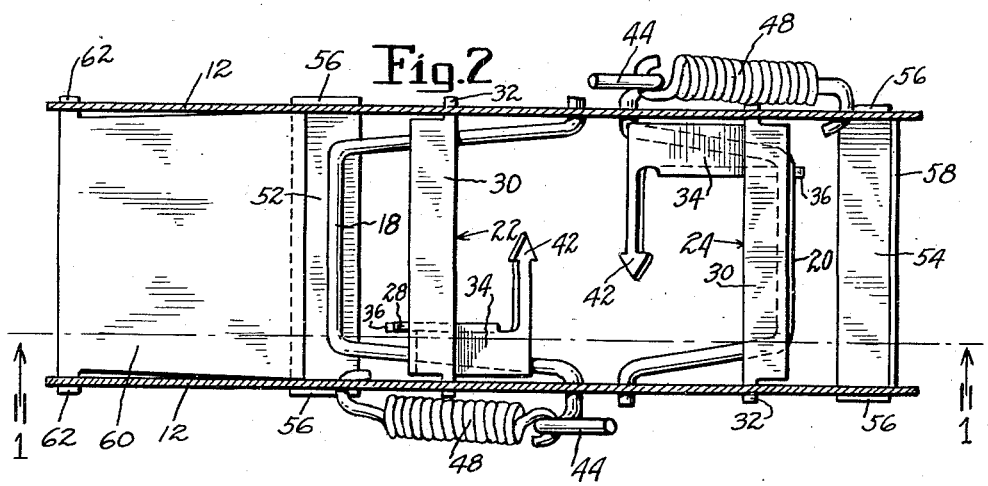
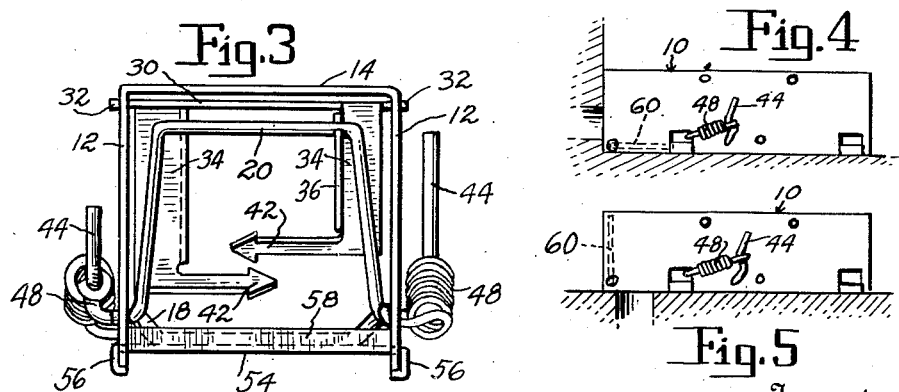
Inventor
JOSHUA PATRICK
By his Attorney Patented Sept. 7, 1948

2,448,618

UNITED STATES PATENT OFFICE 2,448,618

TRAP

Joshua Patrick, Detroit, Mich.

Application October 4, 1944, Serial No. 557,082

3 Claims. (Cl. 43—82)

This invention relates to a trap and is illustrated as embodied in a housing having two snap arms inclosed therein for striking and holding an animal such as a rodent.

An object of the invention is to provide a device which may be safely set without injury to the operator and one which affords protection to humans or animals, such as dogs or cats, not intended to be captured.

Another object of the invention is to provide an inexpensive device which may be economically manufactured from stampings and readily assembled.

A further object of the invention is to provide a tunnel shaped housing having an open bottom and ends with a hinged door at one end for permitting ingress through either end when the door is in its lowered position, or through one end and the bottom when the door is in its end closing position.

A further object of the invention is to provide reset mechanism for the enclosed snap arms externally of the housing so that there is no danger of the operator being injured while manipulating the device.

Other objects and advantages of the invention will more fully appear from the following description taken in connection with the accompanying drawings, in which:

Fig. 1 is a longitudinal sectional view taken on line 1—1 of Fig. 2 of my improved device;

Fig. 2 is a sectional view taken on line 2—2 of Fig. 1;

Fig. 3 is an end view of the device as viewed from the right of Fig. 1;

Fig. 4 is a view illustrating the position of the trap for a horizontally extending opening with the door, shown dotted, in a horizontal position; and Fig. 5 is a view similar to Fig. 4 but showing the trap in position over a vertically extending opening with the door in a vertical position.

Referring to the drawings, I have shown a housing 10 having two side walls 12 and a top 14, preferably formed from a sheet metal stamping. Openings 16 are formed in the side walls 12, adjacent the lower edge thereof, for the reception of pivotally mounted U shaped snap arms 18 and 20. Pivotally mounted latch members 22 and 24 are received in openings 26 and are provided with notches 28 for receiving the snap arms 18 and 20 when the latter are in the raised or set position.

The latch members 22 and 24 are preferably stamped from sheet metal and are duplicate stampings. Each is provided with an upper flange 30 having outwardly extending tabs 32 which are pivotally mounted in the openings 26. At one side of the flange 30 and adjacent one end thereof is a diagonally extending arm 34. At one side of the arm 34 and bent at right angles thereto is a flange 36 having its upper edge formed with the notch 28 for receiving the snap arms 18 and 20 when they are in raised position.

It will be noted that for the purpose of clarity the snap arm 18 has been illustrated in its down or sprung position and that the snap arm 20 has been illustrated in its raised or latched position. The lower edges of the flanges 36 are curved as shown at 40 to strike against the snap arms so that the upward movement of the arms swing the latch members 22 and 24 upwardly so that the notches 28 engage the snap arms to hold them in raised position as illustrated at the right in Fig. 1.

Inwardly extending hook members 42 for receiving a bait are extensions of the arms 34. When these hook members 42 are provided with the bait, the weight thereof, together with the overhanging weight of the latch members 22 and 24, urge the latch members into holding position.

The edge of the flange 30 strikes the top 14 of the housing when the latch members 22 and 24 are in the position illustrating the latch member 22, thus limiting the swinging movement of the latch members.

One free end of each snap arm 18 and 20 is provided with an exterior extension 44 in the form of a lever to permit external manipulation of the snap arms 18 and 20. These extensions 44 are bent to provide notches 46 to receive one end of coil tension springs 48. The opposite end of the springs 48 is received in openings 50 formed in the side walls. The springs 48 normally hold the snap arms 18 and 20 in downward position with considerable pressure against cross bars 52 and 54.

The cross bars 52 and 54 serve a dual purpose; one to form an abutment for the snap arms 18 and 20 and the other to lock the lower edges of the side walls 12 in position. The cross bars 52 and 54 are preferably stampings having projections 56 extending through the openings 50 in the side walls 12 which extensions are bent around the lower edge of the side walls 12 as illustrated more clearly in Fig. 3. The cross bar 54 is provided with an upwardly extending flange 58 between the side walls 12 with the ends of the flange 58 serving as abutments for the side walls 12 to prevent inner distortion. The cross bar 52 may also be provided with such a flange but since it is desirable to have a slightly free inward movement of the side walls 12 at the left end of the housing the flange has been omitted from the cross bar 52. The free inward movement of the side walls permits the walls to have frictional engagement with the swinging door 60.

Referring now to Figs. 4 and 5 it will be noted that the trap may be placed in front of a horizontally extending opening, Fig. 4, or may be placed over a vertically extending opening, Fig. 5. A swinging door 60, preferably a stamping having outwardly extending projections 62 pivotally received in openings 64 in the side walls 12, frictionally engages the side walls 12 to be held in a lower position, as shown in section in Fig. 1, or in an upper position as shown by dot and dash lines in Fig. 1.

If it is desired to place the trap in front of an opening in a side wall, Fig. 4, so that the rodent to leave the opening must pass through the trap, the door 60 is lowered as shown in full lines of Fig. 1. If it is desired to place the trap over an opening in the floor or ground the door 60 is raised to the position shown by dot and dash lines of Fig. 1 and the rodent must then pass through the trap.

The snap arms have been oppositely disposed, the one arm 18 adapted to be sprung by a rodent passing through the trap from the left to the right such as would be the case if a rodent was leaving the hole and the other arm 20 to be sprung by a rodent entering the trap from the right upon return to the hole.

The bait hooks 42 have been shown comparatively larger than wire stock which has heretomore ordinarily been used and the latch members 22 and 24 are arranged to swing in a direction so that a rodent need not nibble at the bait but may also merely strike it with the body in passing through. The release of the latch is accomplished by a push rather than a pull. However, should the rodent nibble at the bait there is bound to be forward movement of the latch and at that instant the snap arm is released and the rodent captured between the snap arm and cross bar. In each instance when the rodent is trapped by either of the arms 18 or 20, the nose of the rodent faces inwardly of the trap.

It will be understood that various changes including the size, shape and arrangement of parts may be made without departing from the spirit of my invention and it is not my intention to limit its scope other than by the terms of the appended claims.

I claim:

1. A trap comprising a tubular housing having, a top and side walls with openings in its ends and bottom, a door adjacent one end of said housing pivotally mounted in said housing for swinging movement within said housing to a position for closing the opening in the bottom and for swinging to a position for closing the end opening in the housing adjacent thereto, a pivotally mounted snap arm between the opposite end of said housing and said door, a cross bar between said side walls for receiving said snap arm, pivotally mounted latch means for retaining said snap arm in a position spaced from said cross bar, means externally of said housing for swinging said snap arm into latching engagement with said latch means, and spring means externally of said housing for urging said snap arm into engagement with said cross bar.

2. A trap comprising, a tubular housing having ingress openings in its opposite ends and bottom, a door for alternately opening or closing one end opening and the bottom opening, a pivotally mounted snap arm between the opposite end of said housing and said door, means between the bottom opening and the pivoted point of said snap arm for receiving said snap arm, pivotally mounted latch means for retaining said snap arm in a position spaced from said means for receiving said snap arm, and means for resiliently urging said snap arm into engagement with said snap arm receiving means.

3. A trap comprising, a housing having closed side walls and a top, ingress end openings and a bottom ingress opening adjacent one end opening, a swinging door for alternately closing either one of the adjacent end or bottom openings, pivotally mounted snap arms between the bottom ingress opening and the opposite end opening, said snap arms being so constructed and arranged to pivot downwardly in opposite directions, one downwardly toward the bottom opening and the other downwardly away from the top of said housing, latch members for temporarily retaining said snap arms in an upper position, lower contact members for receiving said snap arms in their lowered position, tension means for urging said snap arms toward said contact members, and means externally of said housing for swinging said snap arms from a position in engagement with said contact members to a retaining position with said latch members.

JOSHUA PATRICK.

REFERENCES CITED

The following references are of record in the file of this patent:

UNITED STATES PATENTS

| Number | Name | Date |
|---|---|---|
| 1,083,125 | Nebel | Dec. 30, 1913 |
| 1,376,554 | Lange | May 3, 1921 |
| 1,517,210 | Gomber | Nov. 25, 1924 |
| 1,743,389 | Poncelet | Jan. 14, 1930 |
| 2,258,549 | Drake | Oct. 7, 1941 |

FOREIGN PATENTS

| Number | Country | Date |
|---|---|---|
| 179,305 | Great Britain | May 3, 1922 |